United States Patent
Park

(10) Patent No.: US 8,537,387 B2
(45) Date of Patent: Sep. 17, 2013

(54) IMAGE FORMING METHOD AND APPARATUS

(75) Inventor: Jea-hong Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 617 days.

(21) Appl. No.: 12/265,955

(22) Filed: Nov. 6, 2008

(65) Prior Publication Data

US 2009/0262388 A1  Oct. 22, 2009

(30) Foreign Application Priority Data

Apr. 18, 2008 (KR) .................. 10-2008-0036207

(51) Int. Cl.
   *H04N 1/40* (2006.01)
(52) U.S. Cl.
   USPC ........................................ 358/1.15; 358/468
(58) Field of Classification Search
   USPC .................. 358/1.15, 1.16, 468, 1.9, 2.1, 400, 358/500
   See application file for complete search history.

(56) References Cited

U.S. PATENT DOCUMENTS

| | | | | |
|---|---|---|---|---|
| 6,163,383 | A | * | 12/2000 | Ota et al. .................. 358/1.1 |
| 6,795,205 | B1 | * | 9/2004 | Gacek ........................ 358/1.15 |
| 6,801,935 | B2 | * | 10/2004 | Shen ........................... 709/219 |
| 7,110,541 | B1 | * | 9/2006 | Lunt et al. .................... 380/51 |
| 8,069,488 | B2 | | 11/2011 | Go |
| 2007/0086049 | A1 | | 4/2007 | Lee et al. |
| 2008/0229406 | A1 | | 9/2008 | Go |

FOREIGN PATENT DOCUMENTS

| | | |
|---|---|---|
| JP | 09-282120 A | 10/1997 |
| KR | 2005-0104047 A | 11/2005 |
| KR | 2007-0042768 A | 4/2007 |

OTHER PUBLICATIONS

Korean Office Action dated Dec. 27, 2012 of Korean European Patent Application No. 10-2008-0036207.

* cited by examiner

*Primary Examiner* — Thomas D Lee
*Assistant Examiner* — Stephen M Brinich
(74) *Attorney, Agent, or Firm* — Staas & Halsey LLP

(57) ABSTRACT

An image forming method and apparatus, the image forming method including: requesting networked image forming apparatuses to perform a user authorization; receiving account information corresponding to the user authorization request, from one of the image forming apparatuses; determining whether to perform an image forming operation, based on the received account information; and performing the predetermined image forming operation, according to the determination.

22 Claims, 4 Drawing Sheets

IMAGE FORMING METHOD AND APPARATUS

CROSS-REFERENCE TO RELATED APPLICATIONS

This application claims the benefit of Korean Patent Application No. 2008-36207, filed on Apr. 18, 2008, in the Korean Intellectual Property Office, the disclosure of which is incorporated herein, by reference.

BACKGROUND OF THE INVENTION

1. Field of the Invention

Aspects of the present invention relate to an image forming method and apparatus.

2. Description of the Related Art

In order to manage account data of network devices, conventionally, the network devices themselves store the account data. If network devices and servers of a network are requested to transmit account data, the account data stored in the network devices is transmitted to servers, according to the transmission request, and servers collect and administer the account data.

In more detail, in a conventional account data network, account servers are needed to store and administer account data, and administrators are needed to control the account servers. It is necessary to request that the account servers authorize the use of a specific network device, in order to perform an operation using the specific network device. However, in this case, it costs too much for the account servers to administer the account information. In addition, when a specific account server has a problem, the entire network may be affected.

SUMMARY OF THE INVENTION

Aspects of the present invention provide an image forming method and apparatus, by which user account information is administered over a network of image forming apparatuses, thereby promptly and efficiently performing an image forming operation, using the user account information.

According to another aspect of the present invention, there is provided a computer readable recording medium having embodied thereon a computer program for executing the image forming method.

According to an aspect of the present invention, there is provided an image forming method comprising: requesting a plurality of networked image forming apparatuses to perform a user authorization; receiving account information, corresponding to the user authorization request, from one of the image forming apparatuses; determining whether to perform an image forming operation, based on the received account information; and performing the image forming operation, according to the determination.

According to another aspect of the present invention, there is provided a computer readable recording medium to store a computer readable program for executing the image forming method.

According to another aspect of the present invention, there is provided an image forming apparatus comprising: a user authorization unit to request networked image forming apparatuses to perform a user authorization; a network interface unit to receive account information, corresponding to the user authorization request, from one of the image forming apparatuses; an operation determination unit to determine whether to perform an image forming operation, based on the received account information; and an operation performing unit to perform the image forming operation, according to the determination.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
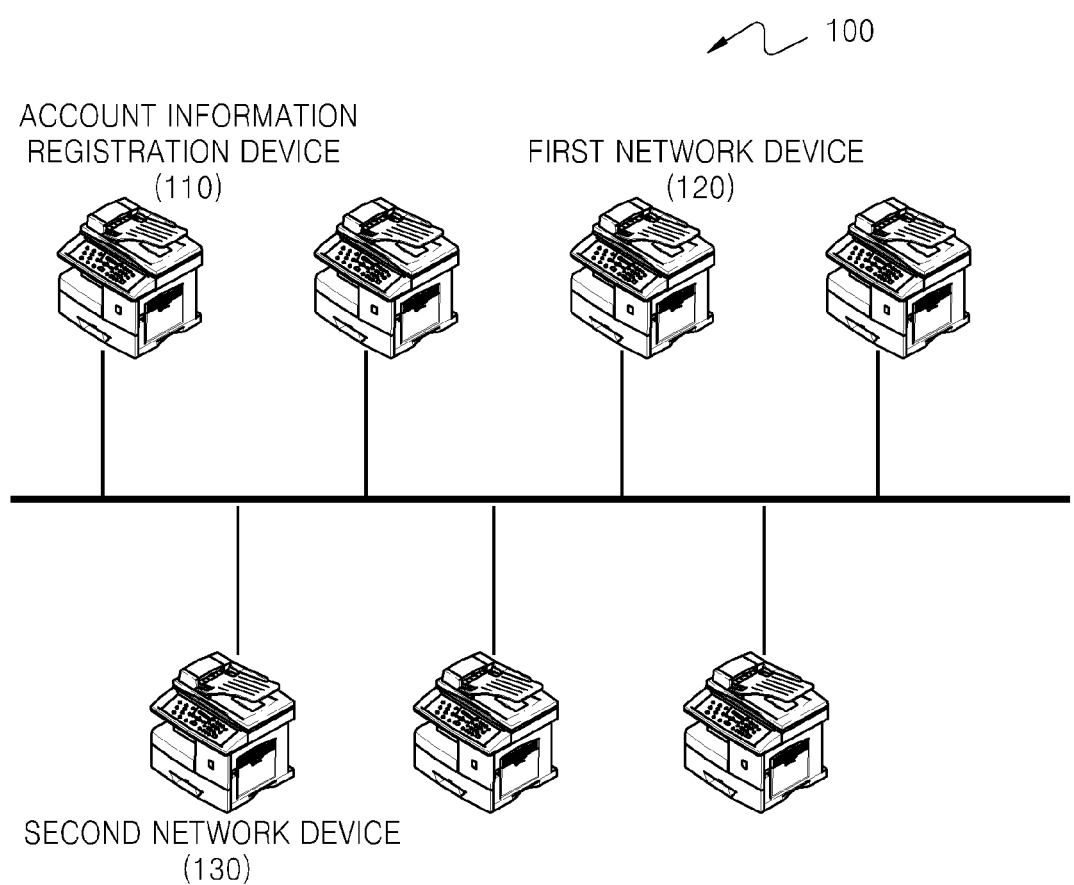
FIG. 1 illustrates an image forming system, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 illustrates an image forming system 100, according to an exemplary embodiment of the present invention. Referring to FIG. 1, the image forming system 100 comprises an account information registration device 110, and a plurality of network devices, including a first network device 120 and a second network device 130. The account information registration device 110 is connected to the first network device 120 and the second network device 130, over a network. The network devices refer to devices that are able to perform at least one image forming operation, such as scanning, faxing, copying, and/or printing. In particular, the first network device 120 refers to a device for performing a user requested image forming operation, and the second network device 130 refers to a device that includes user account information.

The account information registration device 110 registers the user account information, and may be a server or a network image forming device. The account information registration device 110 receives user information, such as a user ID, and determines whether the user ID has been registered. If the account information registration device 110 determines that the user ID has been registered, the account information registration device 110 receives another user ID. If the account information registration device 110 determines that the user ID has not been registered, the account information registration device 110 receives user account information corresponding to the user ID and then registers the user ID and the user account information.

The user account information includes user information, such as the user ID, a password, etc., usable image forming device(s), usable image forming operation(s), and usage limit(s). Also, if the account information registration device 110 receives a request to output user log information from an administrator, the account information registration device 110 receives the user information, generates a user log file, and provides the user log file to the administrator, by requesting user information from all the network devices of the network.

The first network device 120 receives a user ID and a password, provides the user ID and the password to all of the network devices, and requests a user authorization. However, since only the second network device 130 has the user account information, the second network device 130 performs the user authorization, and if successful, transmits the user account information to the first network device 120.

The first network device 120 receives the user account information, determines whether to perform an image forming operation requested by the user, based on the user account information, and selectively performs the image forming operation, according to the determination. The first network device 120 updates the user account information, based on the performance of the image forming operation, and stores the updated user account information. The first network device 120 requests the second network device 130 to delete previously stored user account information, after the first network device 120 stores the user account information.

Figure 2:
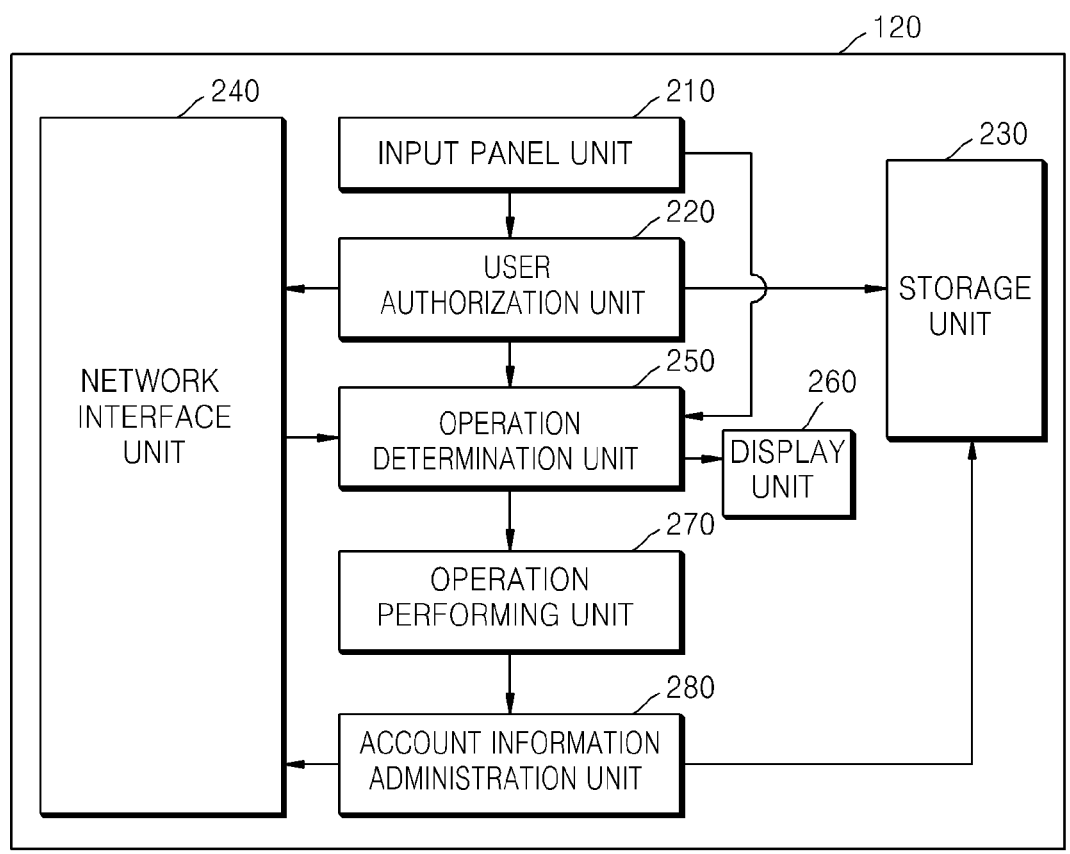
FIG. 2 is a block diagram illustrating a first network device of FIG. 1.

FIG. 2 is a block diagram illustrating the first network device 120 of FIG. 1. Referring to FIG. 2, the first network device 120 comprises an input panel unit 210, a user authorization unit 220, a storage unit 230, a network interface unit 240, an operation determination unit 250, a display unit 260, an operation performing unit 270, and an account information administration unit 280.

The input panel unit 210 receives user information, from a user, and transmits the user information to the user authorization unit 220. The user information can include a user ID, a password, a user name, and/or the like. The input panel unit 210 receives what type of an image forming operation is to be performed, from a user, and transmits the type of the image forming operation to the operation determination unit 250.

The user authorization unit 220 searches for user account information stored in the storage unit 230, based on the user information received from the input panel unit 210, to perform a user authorization. In particular, if the storage unit 230 includes stored user account information that corresponds to the user ID and the password, the user authorization unit 220 determines that the user authorization is successful, and transmits the user account information to the operation determination unit 250.

The user account information includes: the user information, usable image forming device(s); usable image forming operation(s); and usage limit(s). The usable image forming operations relate to permitted image forming operation(s) that correspond to the user ID. The image forming operations can include scanning, faxing, copying, and/or printing operations. The usage limit indicates a permissible amount of usage, according to a particular image forming operation. For example, the user authorization unit 220 may transmit user account information indicating that the permitted image forming operations are copying and printing, and the usage limit is 100 sheets for the copying and 50 sheets for the printing.

However, if the storage unit 230 does not include user account information that matches the user information, the user authorization unit 220 requests other network devices to perform a user authorization, via the network interface unit 240. The user authorization unit 220 performs unicasting, broadcasting, or multicasting, with regard to the user information. For example, the user authorization unit 220 may request network devices, according to a previously established IP address, to perform the user authorization, using the user information. The user authorization unit 220 may also request all networked devices to search for the user account information, using the user information.

The network interface unit 240 transmits the user authorization request received from the user authorization unit 220, to other network devices over the network, if the network interface unit 240 receives the user account information from the second network device 130. The network interface unit 240 transmits the user account information to the operation determination unit 250, in particular.

If the operation determination unit 250 receives user account information from the user authentication unit 220 or the network interface unit 240, the operation determination unit 250 selectively controls whether the operation performing unit 270 performs an operation, according to the permitted type of the image forming operation that corresponds to the user account information. The operation determination unit 250 causes the display unit 260 to display whether the user account information has been received from the network interface unit 240.

When the operation determination unit 250 receives the user account information, if the user information matches the user information that is input into the input panel unit 210, the second network device 130 is a device usable for image forming operations, and the image forming operation requested by the user is a permitted image forming operation, the operation determination unit 250 instructs the operation performing unit 270 to start the operation. The operation determination unit 250 controls the operation performing unit 270, so as not to exceed a usable limit, according to the user account information, while checking the image forming operation. For example, if the image forming operation reaches the usable limit, the operation determination unit 250 cancels or holds the image forming operation.

The display unit 260 displays whether the user account information has been received, via the network interface unit 240, according to the control of the operation determination unit 250. If the user account information is not received, the display unit 260 displays that the user account information is not received. If the user account information has been received, the display unit 260 identifies the image forming device that transmitted the user account information (the second network device 130 in this example).

The operation performing unit 270 performs the permitted image forming operation, under the control of the operation determination unit 250. If the operation performing unit 270 completes the image forming operation, the account information administration unit 280 updates the user account information accordingly and transmits the updated user account information to the storage unit 230 for storage. In particular, the account information administration unit 280 changes the usable limit of the user account information, based on the performed image forming operation, to update the user account information. Furthermore, if the operation performing unit 270 completes the image forming operation, the account information administration unit 280 requests that the second network device 240 delete the user account information.

Figure 3:
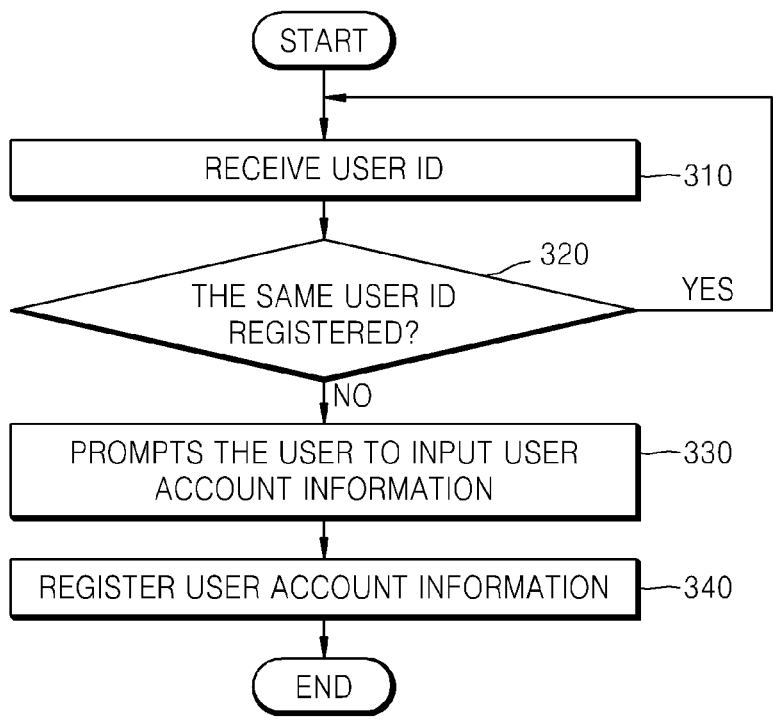
FIG. 3 is a flowchart illustrating an account information registration method, according to an exemplary embodiment of the present invention.

FIG. 3 is a flowchart illustrating an account information registration method, according to an exemplary embodiment of the present invention. Referring to FIG. 3, the method comprises operations that are sequentially performed by the account information registration device 110. Therefore, the description of the account information registration device 110 is applied to the account information registration method.

In operation 310, the account information registration device 110 receives user information, for example, a user ID. The account information registration device 110 may be a server or an image forming device.

In operation 320, the account information registration device 110 examines whether the user ID has been registered. In more detail, the account information registration device 110 searches for a user ID that is registered therein. If the user ID has not been registered therein, the account information registration device 110 determines whether the user ID is registered in other devices networked thereto. As referred to herein, a user ID is registered when the user ID is linked to, or included in, corresponding user account information.

If the received user ID has been registered, the account information registration device 110 notifies a user that the received user ID has been registered. The account information registration device 110 then proceeds to operation 310, to receive another user ID.

In operation 330, if the received user ID has not been registered, the account information registration device 110 notifies the user of this fact, and prompts the user to input user account information. The user account information can include password(s), usable image forming device(s), usable image forming operation(s), and/or usage limit(s). The type of the usable image forming operation refers to a permitted operation corresponding to particular user information. The usage limit indicates a limit allowed according to a corresponding user ID, and may be different for different image forming operations. For example, the account information registration device 110 may receive copying and printing as types of usable image forming operations, and may permit 100 copying sheets and 50 printing sheets, according to the usage limit.

In operation 340, the account information registration device 110 registers the received user account information. Then the method ends.

Figure 4:
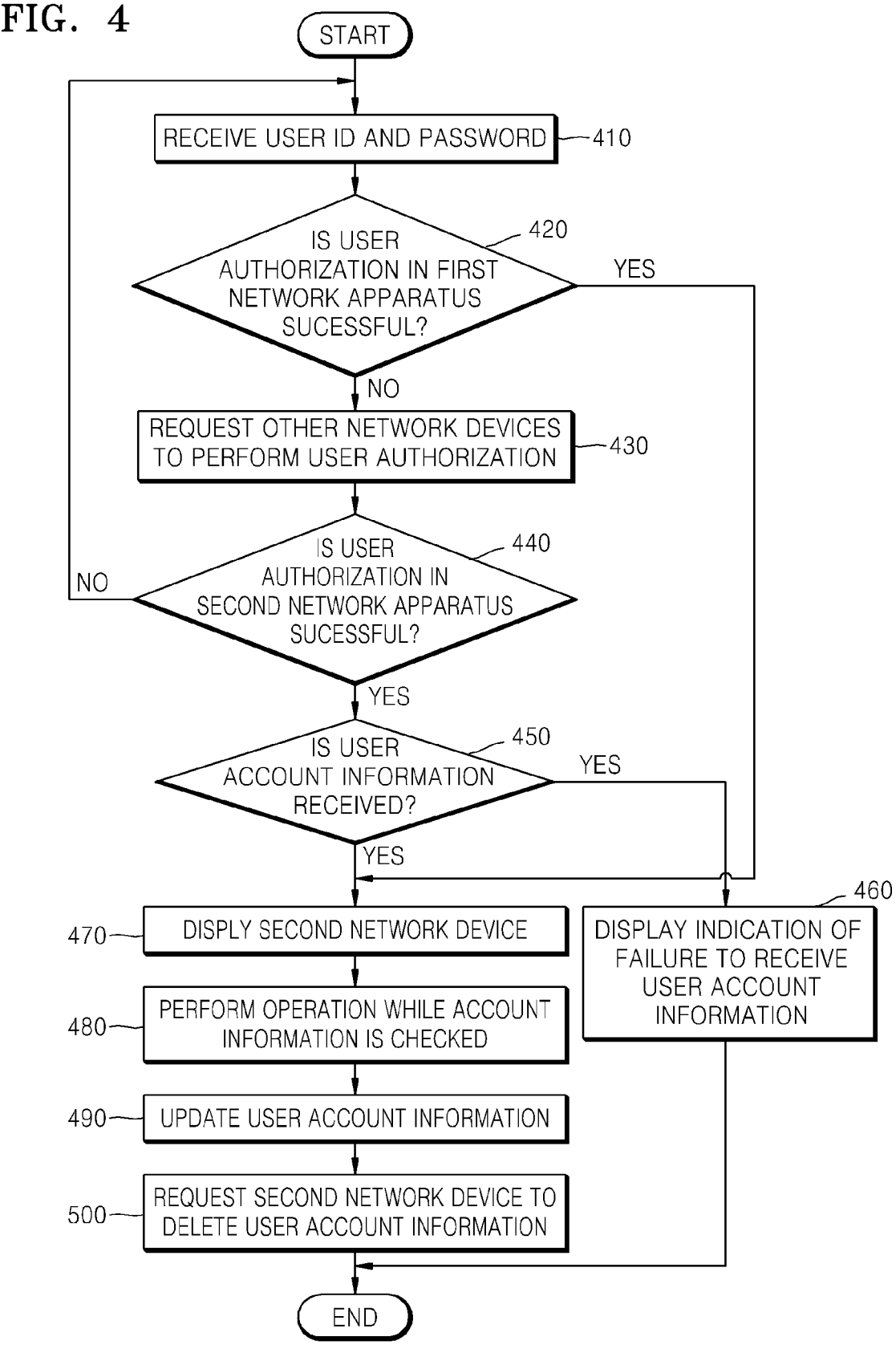
FIG. 4 is a flowchart illustrating an image forming method, according to an exemplary embodiment of the present invention.

FIG. 4 is a flowchart illustrating an image forming method, according to an exemplary embodiment of the present invention. Referring to FIG. 4, the image forming method comprises operations that are sequentially performed by the first and second network devices 120 and 130. Therefore, the description of the first and second network devices 120 and 130 is applied to the image forming method.

In operation 410, the first network device 120 receives user information, for example a user ID and a password. The first and second network devices 120 and 130 refer to networked image forming devices that are able to perform at least one image forming operation.

In operation 420, the first network device 120 searches for user account information stored therein, which corresponds to the received user information. If the first network device 120 detects user account information matching the received user information, the first network device 120 determines that the user is authorized for image forming operations. If the first network device 120 does not detect the user account information, the first network device 120 determines that the user is not authorized.

In operation 430, if the user authorization fails, the first network device 120 unicasts, broadcast, or multicasts the user information to other devices connected to the network, so as to request the other devices to perform a user authorization.

In operation 440, each device connected to the first network device 120 receives the unicasted, broadcasted, or multicasted user information, and searches for corresponding user account information stored therein, so as to perform the user authorization. User account information may be stored in a single device. It is assumed that the second network device 130 includes user account information corresponding to the user information. The second network device 130 uses the user information to search for user account information stored therein, and performs the user authorization. If the user authorization fails, the second network device 130 proceeds to operation 410, to receive another user ID and password.

In operation 450, if the user authorization is successful, the second network device 130 transmits the user account information, to the first network device 120. The first network device 120 determines whether the user account information has been received.

In operation 460, if the first network device 120 fails to receive the user account information, the first network device 120 displays an indication of the failure. In operation 470, if the first network device 120 succeeds in receiving the user account information, the first network device 120 indicates that the second network device 130 has transmitted the user account information.

In operation 480, the first network device 120 begins performing an image forming operation, while checking the user account information. If the operation requested by the user is allowed according to the user account information, the first network device 120 performs the image forming operation, so long as the image forming operation does not exceed the usable limit. If the image forming operation reaches the usable limit, the first network device 120 cancels or holds the image forming operation.

In operation 490, if the first network device 120 completes, cancels, or holds the image forming operation, the first network device 120 updates the user account information, based on the operation and stores the updated account information. In particular, the first network device 120 changes the usable limit of the user account information, based on an operation amount.

In operation 500, the first network device 120 requests the second network device 130 to erase the user account information. The second network device 130 erases the user account information, so that the user account information is stored in only one of the networked devices at a time.

Aspects of the present invention can also be embodied as computer readable code that is stored in a computer readable recording medium. The computer readable recording medium is any data storage device that can be tread by a computer system. Examples of the computer readable recording medium include a read-only memory (ROM), a random-access memory (RAM), a CD-ROM, a magnetic tape, a floppy disk, a optical data storage device, and a carrier wave. The computer readable recording medium can also be a distributed network coupled computer system, where the computer readable code is stored and executed in a distributed fashion.

As described above, an image forming method, according to aspects of the present invention, receives account information from networked devices, determines whether to perform an image forming operation using the received account information, and performs the image forming operation. This results in a reduction in the number of devices used to administer user account information, such as account servers, reduces costs required to administer devices, and prevents disruptions of the system, even when an account server has a problem.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An image forming method comprising:
a image forming apparatus requests a networked image forming apparatuses to perform a user authorization;
the image forming apparatus requesting the user authorization receives account information corresponding to the user authorization request, from the networked image forming apparatus which performs the user authorization successfully, wherein the account information is maintained by the networked image forming apparatus;
determining whether to perform an image forming operation, based on the received account information; and
performing the image forming operation, according to the determination;
updating the received account information, based on the performance of the image forming operation;
wherein the network image forming apparatus transmits the account information only upon a successful user authorization.

2. The method of claim 1, wherein the determining of whether to perform the image forming operation is based on at least one of user information, a usable image forming device, a type of image forming operation, and a usable limit, which is included in the account information.

3. The method of claim 1, wherein the requesting of the image forming apparatuses to perform the user authorization comprises unicasting, broadcasting, or multicasting a user authorization request, using an established IP address.

4. The method of claim 1, wherein all of the networked image forming apparatuses perform the user authorization, by unicasting, broadcasting, or multicasting user information corresponding to the account information.

5. The method of claim 1, further comprising: registering a user identification (ID) using user account information corresponding to the user authorization.

6. The method of claim 1, further comprising: displaying whether the account information is received.

7. The method of claim 6, wherein the displaying comprises displaying a failure indication, if the account information is not received.

8. The method of claim 6, wherein the displaying comprises: identifying an image forming apparatus that transmitted the account information, if the account information is received.

9. The method of claim 1, wherein the updating of the received account information comprises: changing the received account information, according to the performance of the image forming operation.

10. The method of claim 1, further comprising requesting that the image forming apparatus, which transmitted the account information, delete the account information, when the image forming operation ends.

11. An image forming apparatus comprising:
a user authorization unit to request that a networked image forming apparatuses perform a user authorization;
a network interface unit to receive account information corresponding to the user authorization request, from the networked image forming apparatus which performs the user authorization successfully, wherein the account information is maintained by the networked image forming apparatus;
an operation determination unit to determine whether to perform an image forming operation, based on the received account information; and
an operation performing unit to selectively perform the image forming operation, according to the determination;
an account information administration unit to update the received account information, based the performance of the image forming operation;
wherein the network image forming apparatus transmits the account information only upon a successful user authorization.

12. The apparatus of claim 11, wherein the received account information comprises at least one of user information, a usable image forming device, a permitted image forming operation, and a usable limit.

13. The apparatus of claim 11, wherein the user authorization unit unicasts, broadcasts, or multicasts the user authorization request, using an established IP address.

14. The apparatus of claim 11, wherein the user authorization unit unicasts, broadcasts, or multicasts the user authorization request, to the image forming apparatuses.

15. The apparatus of claim 11, further comprising: a display unit to display whether the account information is received.

16. The apparatus of claim 15, wherein the display unit displays a failure indication, if the account information is not received.

17. The apparatus of claim 15, wherein the display unit identifies the image forming apparatus that transmitted the account information, if the account information is received.

18. The apparatus of claim 11, wherein the account information administration unit changes an operation amount of the received account information, based on the performance of the image forming operation.

19. The apparatus of claim 11, wherein the account information administration unit, if the image forming operation ends, requests that the image forming apparatus, which transmitted the account information, deletes the account information, when image forming operation ends.

20. An image forming method comprising:
transmitting user information from a first networked image forming apparatus and an authorization request to a second networked image forming apparatus that maintains account information that corresponds to the user information;
performing a user authorization using the second image forming apparatus;
sending the account information from the second image forming apparatus to the first image forming apparatus when the second image forming apparatus performs the user authorization successfully;
determining whether to perform an image forming operation, using the received account information; and
performing the image forming operation, according to the determination;
updating the received account information, based on the performance of the image forming operation;
wherein the second network image forming apparatus transmits the account information only upon a successful user authorization.

21. The method of claim 20, wherein the transmitting of the user information comprises transmitting the user information to a plurality of networked image forming apparatuses.

22. The method of claim 20, wherein the account information comprises a usable image forming device, a usable image forming operation, and a usage limit.

* * * * *

UNITED STATES PATENT AND TRADEMARK OFFICE
CERTIFICATE OF CORRECTION

PATENT NO.         : 8,537,387 B2
APPLICATION NO.    : 12/265955
DATED              : September 17, 2013
INVENTOR(S)        : Jea-hong Park It is certified that error appears in the above-identified patent and that said Letters Patent is hereby corrected as shown below:

In the Claims:

In Column 8, Line 5, In Claim 11, after "based" insert -- on --.

Signed and Sealed this
Eleventh Day of February, 2014

Michelle K. Lee
*Deputy Director of the United States Patent and Trademark Office*